US012142866B2

(12) United States Patent
Matsuura

(10) Patent No.: US 12,142,866 B2
(45) Date of Patent: Nov. 12, 2024

(54) TERMINAL FITTING AND CONNECTOR

(71) Applicant: SUMITOMO WIRING SYSTEMS, LTD., Mie (JP)

(72) Inventor: Junya Matsuura, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 346 days.

(21) Appl. No.: 17/784,743

(22) PCT Filed: Nov. 30, 2020

(86) PCT No.: PCT/JP2020/044405

§ 371 (c)(1),
(2) Date: Jun. 13, 2022

(87) PCT Pub. No.: WO2021/124842

PCT Pub. Date: Jun. 24, 2021

(65) Prior Publication Data

US 2023/0006389 A1 Jan. 5, 2023

(30) Foreign Application Priority Data

Dec. 20, 2019 (JP) ................................ 2019-229949

(51) Int. Cl.
*H01R 13/11* (2006.01)
*H01R 13/40* (2006.01)
(Continued)

(52) U.S. Cl.
CPC ........... *H01R 13/111* (2013.01); *H01R 13/40* (2013.01); *H01R 13/502* (2013.01); *H01R 13/64* (2013.01)

(58) Field of Classification Search
CPC ..... H01R 13/111; H01R 13/11; H01R 13/113; H01R 13/40; H01R 13/502; H01R 13/64; H01R 31/08; H01R 31/085
(Continued)

(56) References Cited

U.S. PATENT DOCUMENTS

2013/0109250 A1 5/2013 Haga
2016/0013569 A1* 1/2016 Chikusa .............. H01R 13/113 439/816
(Continued)

FOREIGN PATENT DOCUMENTS

JP 2003-331968 A 11/2003
JP 2012-134004 A 7/2012
(Continued)

OTHER PUBLICATIONS

International Search Report issued on Feb. 9, 2021 for WO 2021/124842 A1 (4 pages).

*Primary Examiner* — Gary F Paumen
(74) *Attorney, Agent, or Firm* — Venjuris, P.C.

(57) ABSTRACT

A terminal fitting is provided with a tubular connecting portion and a deflectable and deformable resilient contact portion arranged in the connecting portion. The connecting portion includes a bead extending in a front-rear direction and projecting inward toward a contact point of the resilient contact portion on a base wall portion facing the contact point. An outer surface of the base wall portion includes recesses recessed inwardly in both front and rear end parts of the bead, and a shorting terminal facing portion located outwardly of bottoms of the recesses between the both front and rear end parts of the bead.

4 Claims, 6 Drawing Sheets

(51) Int. Cl.
*H01R 13/502* (2006.01)
*H01R 13/64* (2006.01)

(58) Field of Classification Search
USPC .......................................... 439/851, 852, 507
See application file for complete search history.

(56) References Cited

U.S. PATENT DOCUMENTS

| | | | | |
|---|---|---|---|---|
| 2017/0040728 | A1* | 2/2017 | Saito | H01R 4/185 |
| 2018/0366860 | A1* | 12/2018 | Naoi | H01R 13/4361 |
| 2019/0089084 | A1* | 3/2019 | Hirano | H01R 13/2442 |
| 2019/0157786 | A1* | 5/2019 | Horiuchi | H01R 13/187 |

FOREIGN PATENT DOCUMENTS

| | | | |
|---|---|---|---|
| JP | 2015-204186 | A | 11/2015 |
| JP | 2016-136542 | A | 7/2016 |

* cited by examiner

TERMINAL FITTING AND CONNECTOR

CROSS REFERENCE TO RELATED APPLICATIONS

This application is a national phase of PCT application No. PCT/JP2020/044405, filed on 30 Nov. 2020, which claims priority from Japanese patent application No. 2019-229949, filed on 20 Dec. 2019, all of which are incorporated herein by reference.

TECHNICAL FIELD

The present disclosure relates to a terminal fitting and a connector.

BACKGROUND

A connector of Patent Document 1 includes a female housing and a male housing connectable to each other. A pair of female terminals and a shorting terminal are accommodated in the female housing. The shorting terminal includes contact point portions to be brought into contact with the pair of female terminals. The pair of female terminals are shorted to each other via the shorting terminal. A shorted state of the pair of female terminals is released when the connection of the female housing and the male housing is completed.

Note that a specific shape of the female terminal is not described in Patent Document 1. Patent Document 2 and Patent Document 3 describe a specific shape of a female terminal of this type. A female terminal normally includes a tubular connecting portion. A deflectable and deformable resilient contact portion is arranged in the connecting portion. The connecting portion includes a bead for sandwiching a tab of a male terminal between a contact point of the resilient contact portion and the bead. Note that the connecting portion, the resilient contact portion, the contact point and the bead are respectively a compressing portion, a resilient contact piece, a dome-shaped embossed contact point portion and an inner facing contact surface in Patent Document 2 and are respectively a box portion, a resilient deflecting portion, an indent portion and a facing contact portion in Patent Document 3.

PRIOR ART DOCUMENT

Patent Document

Patent Document 1: JP 2012-134004 A
Patent Document 2: JP 2013-098088 A
Patent Document 3: JP 2015-204186 A

SUMMARY OF THE INVENTION

Problems to be Solved

The contact point portion of the shorting terminal may have to be brought into contact with an outer surface part of the bead in the connecting portion for various reasons such as a reason in the design of the female housing, the female terminal and the shorting terminal. However, the outer surface part of the bead is recessed inwardly in the connecting portion. Thus, in the case of the above configuration, there is a concern that the contact point portion of the shorting terminal enters a recess of the bead. If the contact point portion enters the recess of the bead, a sufficient contact load cannot be obtained between the shorting terminal and the female terminal and the shorting terminal and the female terminal may become insufficiently conductive.

Accordingly, it is aimed to provide a terminal fitting and a connector capable of ensuring connection reliability with a shorting terminal.

Means to Solve the Problem

The present disclosure is directed to a terminal fitting with a tubular connecting portion, and a deflectable and deformable resilient contact portion arranged in the connecting portion, wherein the connecting portion includes a bead extending in a front-rear direction and projecting inward toward a contact point of the resilient contact portion on a base wall portion facing the contact point, and an outer surface of the base wall portion includes recesses recessed inwardly in both front and rear end parts of the bead and a shorting terminal facing portion located outwardly of bottoms of the recesses between the both front and rear end parts of the bead.

The present disclosure is also directed to a connector with the terminal fitting configured as described above and a housing for accommodating a pair of the terminal fittings and a shorting terminal, the shorting terminal having a pair of contact surfaces facing the shorting terminal facing portions in the pair of terminal fittings.

Effect of the Invention

According to the present disclosure, it is possible to provide a terminal fitting and a connector capable of ensuring connection reliability with a shorting terminal.

DETAILED DESCRIPTION TO EXECUTE THE INVENTION

Description of Embodiments of Present Disclosure

Figure 1:
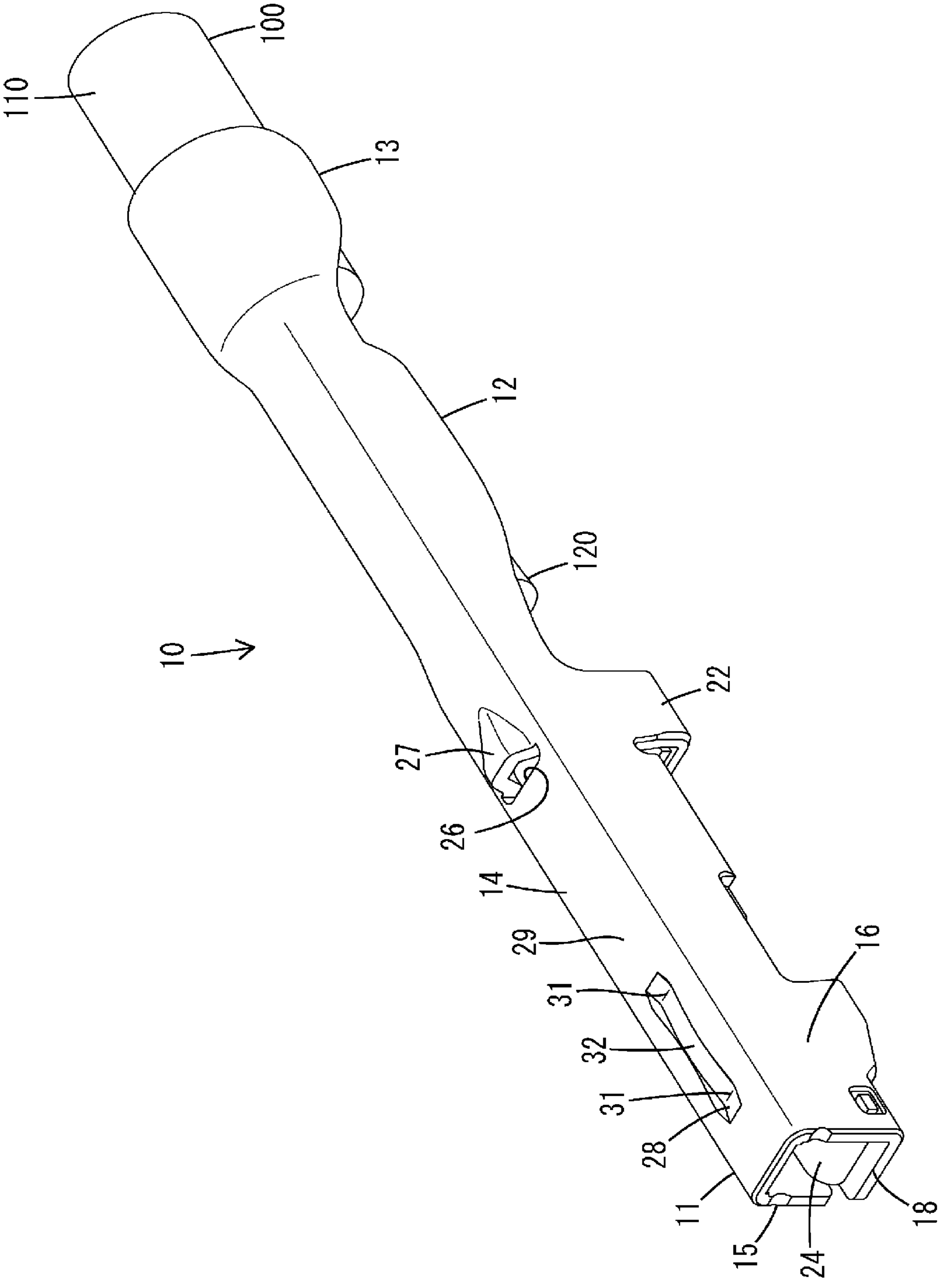
FIG. 1 is a perspective view of a terminal fitting according to an embodiment when viewed from a front upper side.

First, embodiments of the present disclosure are listed and described.

(1) The terminal fitting of the present disclosure is provided with a tubular connecting portion, and a deflectable and deformable resilient contact portion arranged in the connecting portion, wherein the connecting portion includes a bead extending in a front-rear direction and projecting inward toward a contact point of the resilient contact portion on a base wall portion facing the contact point, and an outer surface of the base wall portion includes recesses recessed inwardly in both front and rear end parts of the bead and a shorting terminal facing portion located outwardly of bottoms of the recesses between the both front and rear end parts of the bead. A shorting terminal is contactably arranged to face the shorting terminal facing portion, whereby the shorting terminal can be prevented from entering into the bottoms of the recesses. Thus, a conductive state of the terminal fitting and the shorting terminal can be satisfactorily realized and the connection reliability of the terminal fitting and the shorting terminal can be secured.

(2) Preferably, a part of the bead between the both front and rear end parts in the base wall portion is thicker than the both front and rear end parts of the bead. By pressing the outer surface of the base wall portion by a press, the recesses can be formed in the both front and rear end parts of the bead. By designing press parts such that a material in both front and rear end parts of the bead moves toward the part of the bead between the both front and rear end parts during pressing, the part of the bead between the both front and rear end parts can be thickened. By pressing, the shorting terminal facing portion located outwardly of the bottoms of the recesses can be easily formed between the both front and rear end parts of the bead in the outer surface of the base wall portion. By thickening the part of the bead between the both front and rear end parts, the rigidity of this part can be enhanced.

(3) Further, the connector of the present disclosure is provided with the terminal fitting configured as described above and a housing for accommodating a pair of the terminal fittings and a shorting terminal, the shorting terminal having a pair of contact surfaces facing the shorting terminal facing portions in the pair of terminal fittings. According to this configuration, since the pair of contact surfaces of the shorting terminal can face and contact the shorting terminal facing portions, the connection reliability of the terminal fittings and the shorting terminal can be ensured.

(4) The recesses may be arranged in a widthwise central part of the outer surface of the base wall portion, and a widthwise central part of the contact surface may be arranged at a position deviated in a width direction from the widthwise central part of the outer surface of the base wall portion. According to this configuration, the shorting terminal is less likely to enter the recesses and the connection reliability of the terminal fittings and the shorting terminal can be more improved.

Details of Embodiment of Present Disclosure

Specific examples of a terminal fitting and a connector of the present disclosure are described below with reference to the drawings. Note that the present invention is not limited to these illustrations and is intended to be represented by claims and include all changes in the scope of claims and in the meaning and scope of equivalents.

<Connector>

Figure 4:
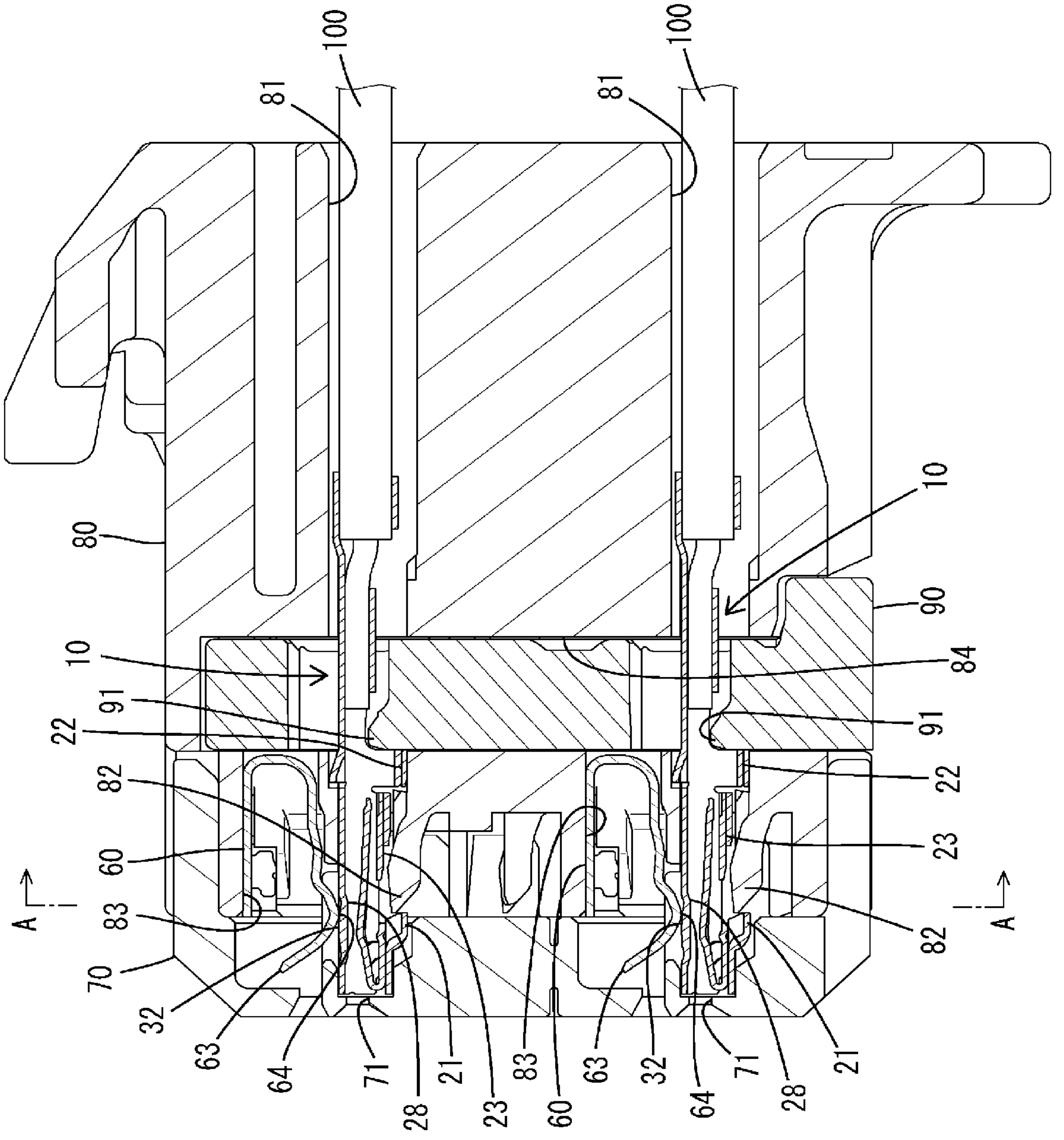
FIG. 4 is a section showing a state where terminal fittings and a shorting terminal are accommodated in a housing in a connector according to the embodiment.

A connector includes a housing 80, shorting terminals 60 and terminal fittings 10 as shown in FIG. 4. Note that, in the following description, a vertical direction is based on a state where the housing 80, the shorting terminals 60 and the terminal fittings 10 are arranged as shown in FIG. 4. A right side of FIG. 4 is referred to as a front side concerning a front-rear direction.

The housing 80 is made of synthetic resin and accommodates the terminal fittings 10 and the shorting terminals 60. The housing 80 is in the form of a rectangular block as a whole, and fit into an unillustrated mating housing with a front side in the lead. The housing 80 includes a plurality of cavities 81 penetrating in the front-rear direction. A deflectable and deformable locking lance 82 is provided at the inner surface of each cavity 81 in the housing 80. The terminal fitting 10 is inserted into the cavity 81 from behind and locked by the locking lance 82.

Figure 5:
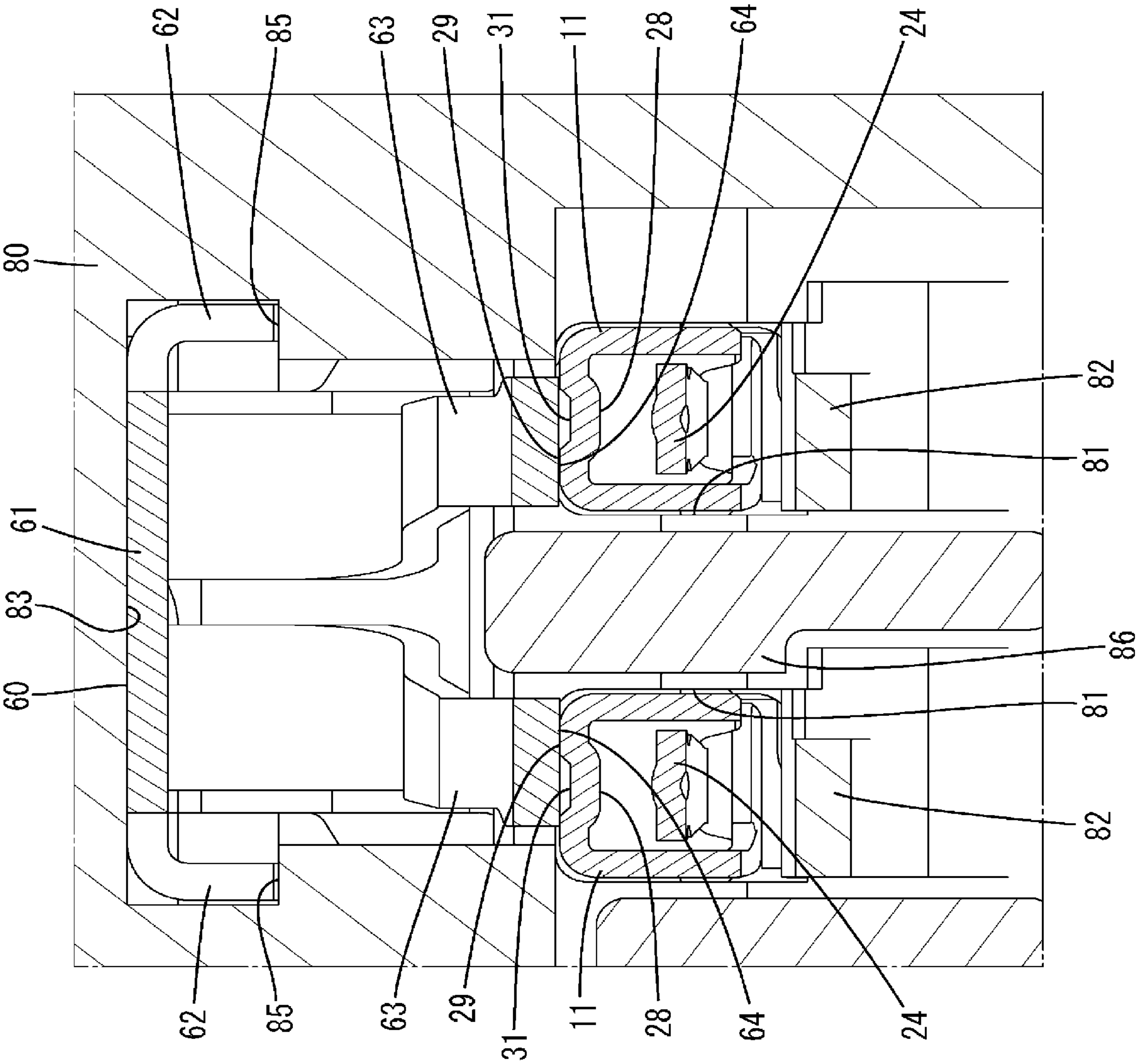
FIG. 5 is a diagram showing an upper side of a cross-section along A-A of FIG. 4.

The housing 80 includes a plurality of shorting terminal accommodating portions 83 open in a front surface. As shown in FIG. 5, the shorting terminal accommodating portion 83 communicates with a pair of the cavities 81 adjacent in a width direction (a lateral direction of FIG. 5 and a direction orthogonal to the front-rear direction and the vertical direction) in a front end part of the housing 80.

As shown in FIG. 4, the housing 80 includes a mounting hole 84 extending in the vertical direction and open in the lower surface of the housing 80 at an intermediate position in the front-rear direction. A retainer 90 is inserted into the mounting hole 84 of the housing 80 from below. The shorting terminal accommodating portions 83 and the cavities 81 communicate with the mounting hole 84. The shorting terminal accommodating portions 83 are located forward of the mounting hole 84.

A front holder 70 is mounted on the housing 80. The front wall of the front holder 70 covers the front surface of the housing 80 and stops the terminal fittings 10 in front. Further, a front part of the shorting terminal 60 (front end parts of resilient pieces 63 to be described later) is arranged inside the front wall of the front holder 70. The front wall of the front holder 70 is provided with insertion openings 71 at positions corresponding to the respective cavities 81. A tab 210 (see FIG. 3) of a mating terminal fitting 200 is inserted into the cavity 81 through the insertion opening 71 and electrically connected to the terminal fitting 10 arranged in the cavity 81.

<Shorting Terminal>

The shorting terminal 60 is formed, such as by bending an electrically conductive metal plate. As shown in FIG. 5, the shorting terminal 60 includes a base portion 61 in the form of a flat plate along the width direction on an upper end, a pair of fixing portions 62 bent downward from both widthwise ends of the base portion 61 and a pair of the resilient pieces 63 extending forward after projecting downward from the rear end of the base portion 61.

As shown in FIG. 5, the base portion 61 is arranged along the upper surface of the inner wall of the shorting terminal accommodating portion 83. The fixing portions 62 are locked to stepped portions 85 formed on both widthwise end parts of the shorting terminal accommodating portion 83. The shorting terminal 60 is retained in the shorting terminal accommodating portion 83 by the locking of the fixing portions 62 to the stepped portions 85.

The resilient pieces 63 are in the form of strip plates. A front part of the resilient piece 63 is narrower than a rear part. As shown in FIG. 4, the front part of the resilient piece 63 is curved downward in a side view and has a contact surface 64 along the width direction in a lower end part. The contact surface 64 of the resilient piece 63 can contact the terminal fitting 10. A width of the contact surface 64 is larger than that of a bead 28 to be described later and larger than half the width of a base wall portion 14 to be described later.

<Terminal Fitting>

Figure 2:
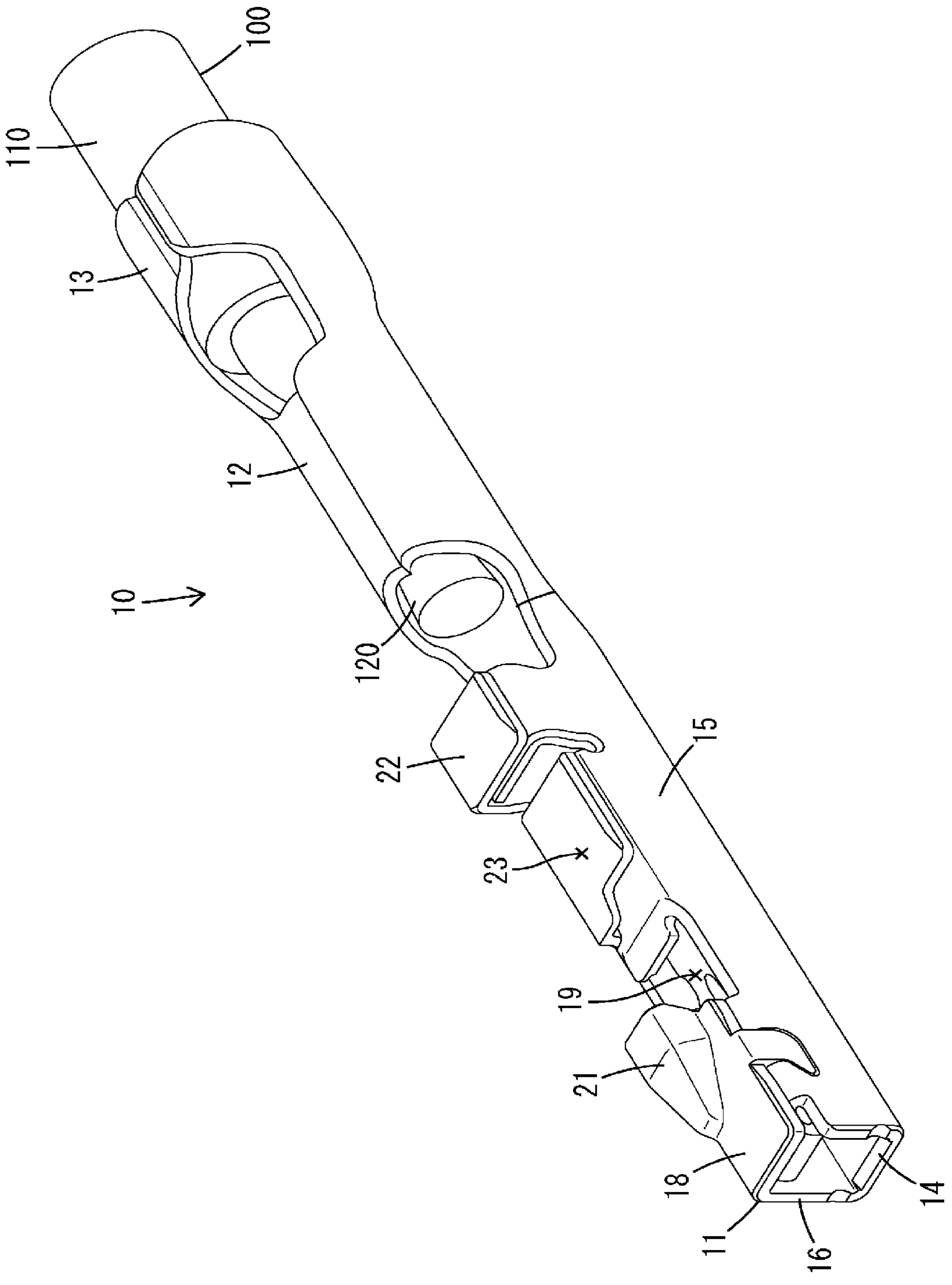
FIG. 2 is a perspective view of the terminal fitting when viewed from a front lower side.

The terminal fitting 10 is similarly formed, such as by bending an electrically conductive metal plate. As shown in FIGS. 1 and 2, the terminal fitting 10 is shaped to be elongated in the front-rear direction as a whole. The terminal fitting 10 includes a tubular connecting portion 11 arranged in a front part and a wire barrel portion 12 and an insulation barrel portion 13 in the form of open barrels arranged in a rear part. The terminal fitting 10 is a female terminal fitting.

The wire barrel portion 12 is crimped and electrically connected to a core wire 120 exposed by removing a coating 110 in an end part of a coated wire 100. The insulation barrel portion 13 is located rearward of the wire barrel portion 12. The insulation barrel portion 13 is crimped and mechanically connected to the coating 110 in the end part of the coated wire 100.

The connecting portion 11 is in the form of a rectangular extending in the front-rear direction. The connecting portion 11 includes the base wall portion 14, a pair of side wall portions 15, 16 projecting downward from both widthwise ends of the base wall portion 14, an inner wall portion 17 (see FIG. 3) extending from the lower end of one side wall portion 15 toward the lower end of the other side wall portion 16 and an outer wall portion 18 extending from the lower end of the other side wall portion 16 toward the lower end of the one side wall portion 15 and arranged outside (below) the inner wall portion 17.

Figure 3:
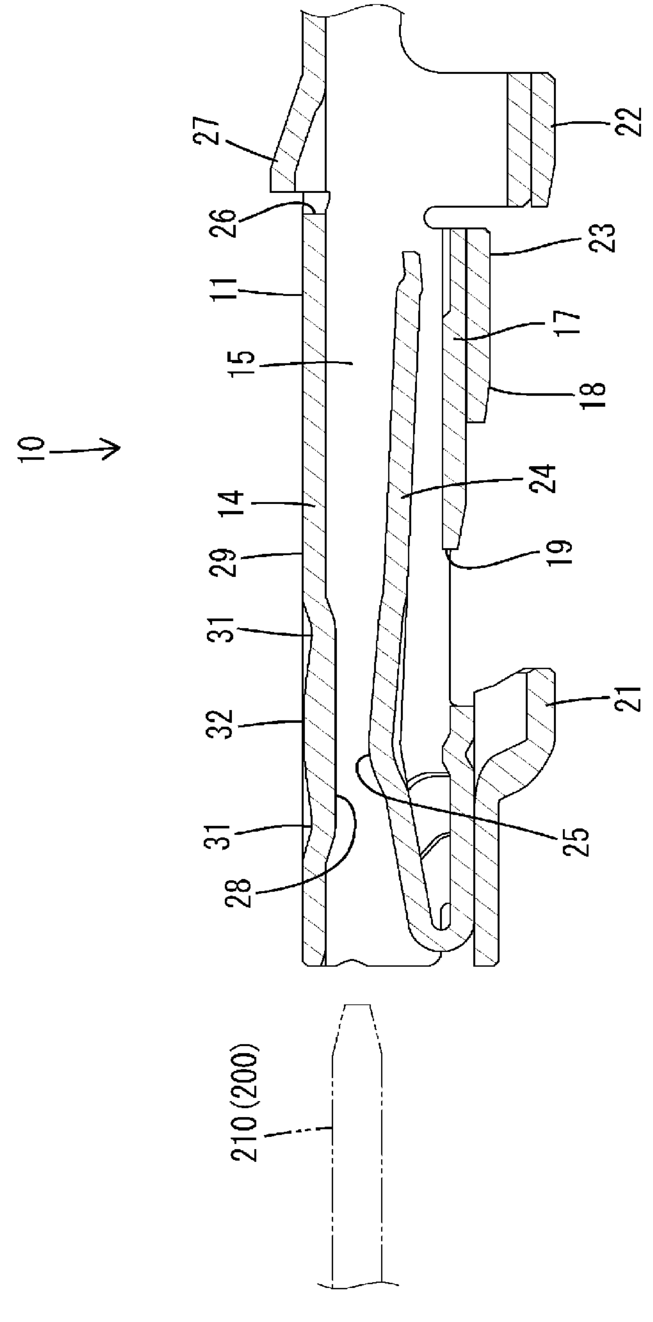
FIG. 3 is a section of a connecting portion of the terminal fitting.

As shown in FIG. 3, a lower wall part of the connecting portion 11 has a double wall structure by having the inner wall portion 17 and the outer wall portion 18. The inner wall portion 17 and the outer wall portion 18 include a lance hole 19 penetrating through the lower wall part in an in-out direction at an intermediate position in the front-rear direction. The outer wall portion 18 includes a locking projection 21 bent downward in front of the lance hole 19.

The connecting portion 11 includes a gate-shaped protrusion 22 projecting downward in a rear end part. The protrusion 22 is arranged to face the locking projection 21. A rear end part of each of the inner wall portion 17 and the outer wall portion 18 constitutes a lower wall part of the protrusion 22. The lower wall part of the connecting portion 11 includes a recess-like lance entering portion 23 recessed between the protrusion 22 and the locking projection 21.

If the terminal fitting 10 is inserted into the cavity 81 of the housing 80 as shown in FIG. 4, the locking lance 82 enters the lance entering portion 23 and is arranged to face the locking projection 21. The terminal fitting 10 is primarily locked and retained not to come out rearward by the locking lance 82. A tip part of the locking lance 82 is arranged to face the lance hole 19 and avoid interference with the inner wall portion 17 and the outer wall portion 18. If the retainer 90 is deeply inserted into the mounting hole 84 of the housing 80, a retaining portion 91 of the retainer 90 is arranged to face the protrusion 22. The terminal fitting 10 is secondarily locked and reliably retained not to come out rearward by the retainer 90.

As shown in FIG. 3, a resilient contact portion 24 is arranged inside the connecting portion 11. The resilient contact portion 24 is in the form of a strip plate and extends rearward from the front end of the inner wall portion 17. The resilient contact portion 24 is deflectable and deformable in the vertical direction with a front end side of the inner wall portion 17 as a fulcrum.

The resilient contact portion 24 includes an embossed contact point 25 projecting upward at an intermediate position in the front-rear direction (extending direction). A gap for allowing the insertion of the tab 210 of the mating terminal fitting 200 is formed between the contact point 25 of the resilient contact portion 24 and the later-described bead 28 of the base wall portion 14. The tab 210 is sandwiched between the contact point 25 of the resilient contact portion 24 and the bead 28 while receiving a resilient reaction force from the resilient contact portion 24. In this way, the terminal fitting 10 is electrically connected to the mating terminal fitting 200.

As shown in FIG. 1, the base wall portion 14 is integrally continuous with a region on the side of the wire barrel portion 12 in the front-rear direction. The base wall portion 14 includes a cut 26 along the width direction in a rear end part and a stabilizer 27 bent and raised upward behind the cut 26. The stabilizer 27 functions to guide the insertion of the terminal fitting 10 into the cavity 81 of the housing 80 and prevent erroneous insertion of the terminal fitting 10.

The base wall portion 14 includes the bead 28 at an intermediate position in the front-rear direction (in particular, in a region near the front end of the base wall portion 14). The bead 28 is in the form of a rib projecting downward and extending in the front-rear direction in a widthwise central part of the base wall portion 14. As shown in FIG. 1, the bead 28 has a rectangular plan view shape long in the front-rear direction in the widthwise central part of the base wall portion 14.

As shown in FIG. 3, the lower (inner) surface of the bead 28 is arranged along the front-rear direction to face the contact point 25 of the resilient contact portion 24. The upper (outer) surface of the bead 28 includes a pair of recesses 31 in both front and rear end parts and a shorting terminal facing portion 32 at a position between the both front and rear end parts (front-rear center position in the case of this embodiment). The upper surface (recesses 31 and shorting terminal facing portion 32) of the bead 28 is continuously arranged at the same height in the width direction. The upper surface of the base wall portion 14 has a reference surface 29 along the front-rear direction on both front and rear sides across the upper surface of the bead 28. The reference surface 29 is a surface surrounding the bead 28 in the upper surface of the base wall portion 14 and formed to be flat except at the bead 28, the cut 26 and the stabilizer 27, out of the upper surface of the base wall portion 14.

Figure 6:
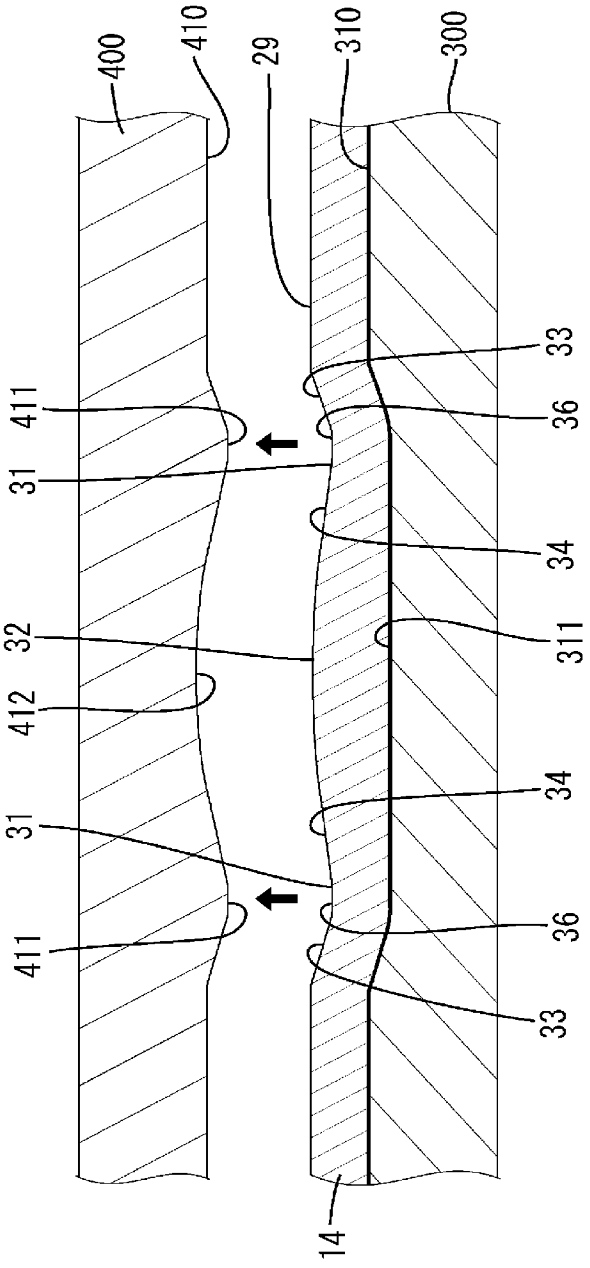
FIG. 6 is an enlarged section showing a pressing step of forming recesses and a shorting terminal facing portion in an outer surface of a base wall portion.

The recess 31 is formed into a concave curved surface in the upper surface of the bead 28. As shown in FIG. 6, the recess 31 has a first region 33 linearly inclined downward from the reference surface 29 toward a bottom 36 of the recess 31 and a second region 34 linearly inclined upward from the bottom 36 of the recess 31 toward the shorting terminal facing portion 32. The first region 33 and the reference surface 29, the first region 33 and the bottom 36, the second region 34 and the bottom 36, and the second region 34 and the shorting terminal facing portion 32 are connected to form a curved surface. An angle of inclination (angle of inclination with respect to the front-rear direction) of the first region 33 is larger than that of the second region 34.

The shorting terminal facing portion 32 is arranged to be flat or form a convex curved surface in the front-rear direction between the front and rear recesses 31. The shorting terminal facing portion 32 is arranged above (outwardly of) of the bottoms 36 of the recesses 31 and below (inwardly of) the reference surface 29. The shorting terminal facing portion 32 can face and contact the contact surface 64 of the resilient piece 63 of the shorting terminal 60. Note that the bead 28 is formed symmetrically in the front-rear direction.

<Bead Forming Method>

First, a metal plate as a base material is stamped to form a development shape of the terminal fitting 10. When the terminal fitting 10 is in a developed state, a base of the base wall portion 14 (a part corresponding to the base wall portion 14 before press-working) is placed on a receiving surface 310 of a receiving die 300. As shown in FIG. 6, the receiving surface 310 of the receiving die 300 is shaped to correspond to the lower surface shape of the base wall portion 14. The receiving surface 310 of the receiving die 300 has a recessed surface portion 311 corresponding to the lower surface of the bead 28.

Subsequently, a press surface 410 of a press die 400 is pressed against the upper surface of the base of the base wall portion 14. The press surface 410 of the press die 400 is shaped to correspond to the upper surface shape of the base wall portion 14. The press surface 410 of the press die 400 has a curved surface part corresponding to the upper surface of the bead 28. The curved surface part of the press die 400 includes projections 411 having a convex curved surface at positions corresponding to the front and rear recesses 31, and an escaping portion 412 having a concave curved surface at a position corresponding to the shorting terminal facing portion 32. The escaping portion 412 is recessed to a depth larger than a height from the bottoms 36 of the recesses 31 to the shorting terminal facing portion 32 in the vertical direction.

The press die 400 presses the upper surface of the base wall portion 14, whereby both front and rear end parts of the bead 28 are compressed between the projections 411 of the press die 400 and the recessed surface portion 311 of the receiving die 300 and the recesses 31 are formed in the upper surface of the bead 28. Simultaneously, the material on the sides of the recesses 31 moves toward the escaping portion 412 of the press die 400, and a part of the bead 28 between the both front and rear end parts is raised to form the shorting terminal facing portion 32 in the upper surface of the bead 28.

As described above, the material moves from both front and rear end sides of the bead 28 toward a front-rear central side by the upper surface of the base wall portion 14 being pressed as described above. As a result, as shown in FIG. 6, the part including the shorting terminal facing portion 32 between the both front and rear end parts becomes thicker than the both front and rear end parts including the recesses 31 in the bead 28. Further, the part of the bead 28 between the both front and rear end parts is also thicker than a part of the base wall portion 14 on the side of the reference surface 29.

<Connection Structure of Terminal Fittings and Shorting Terminals>

In assembling, the shorting terminals 60 are accommodated into the shorting terminal accommodating portions 83 and the terminal fittings 10 are accommodated into the cavities 81. Out of these, a pair of the terminal fittings 10 are in contact with the resilient pieces 63 of the shorting terminal 60 facing the cavities 81 while being inserted in the cavities 81 (see FIG. 5). In other words, the pair of resilient pieces 63 are in contact with the terminal fittings 10 inserted into the cavities 81 while applying resilient reaction forces to the terminal fittings 10. In this way, the pair of terminal fittings 10 are electrically shorted via the shorting terminal 60. Note that a shorted state of the pair of terminal fittings 10 is released by an unillustrated releasing portion when the housing 80 and the unillustrated mating housing are properly connected.

In the case of this embodiment, the contact surfaces 64 of the pair of resilient pieces 63 are arranged in regions corresponding to the beads 28, out of the upper surfaces of the base wall portions 14, for reasons relating to the setting of the connector.

Here, the upper surface of the bead 28 includes the recesses 31 in the both front and rear end parts and the shorting terminal facing portion 32 between the front and rear ends. Thus, the contact surface 64 of the resilient piece 63 can face and contact the shorting terminal facing portion 32 (see FIG. 4). A recess amount of the shorting terminal facing portion 32 is sufficiently less than those of the recesses 31. Therefore, the resilient piece 63 does not excessively drop into the bead 28 and a satisfactory contact load is secured between the shorting terminal 60 and the terminal fitting 10.

Further, in the case of this embodiment, a widthwise central part of the contact surface 64 of the resilient piece 63 is set at a position deviated in the width direction from the widthwise central part of the upper surface of the base wall portion 14 as shown in FIG. 5. Then, the contact surface 64 of the resilient piece 63 is in contact with one widthwise side (widthwise inner side on the side of a partition wall 86 partitioning between the adjacent cavities 81 in the case of this embodiment) of the upper surface of the base wall portion 14 in a biased manner. The one widthwise side of the upper surface of the base wall portion 14 is constituted by the reference surface 29. Thus, the contact surface 64 of the resilient piece 63 can stably contact the reference surface 29 of the base wall portion 14 along the width direction.

On the other hand, if the widthwise central part of the contact surface 64 of the resilient piece 63 and the widthwise central part of the upper surface of the base wall portion 14 coincide in the width direction unlike this embodiment, there is a concern that the resilient piece 63 drops into the recess 31 when the resilient piece 63 is positionally deviated in the width direction due to an assembling error, vibration or the like.

In that respect, according to the above configuration, the contact surface 64 of the resilient piece 63 can widely contact the reference surface 29 of the base wall portion 14 on the one widthwise side of the upper surface of the base wall portion 14. As a result, the concern that the resilient piece 63 drops into the recess 31 can be reduced.

As described above, according to this embodiment, the contact surface 64 of the resilient piece 63 of the shorting terminal 60 is contactably arranged to face the shorting terminal facing portion 32, whereby the entry (drop) of the contact surface 64 of the resilient piece 63 into the bottom 36 of the recess 31 can be prevented. Thus, a conductive state of the terminal fitting 10 and the shorting terminal 60 can be satisfactorily realized and the connection reliability of the terminal fitting 10 and the shorting terminal 60 can be ensured.

Further, in the case of this embodiment, the recesses 31 can be formed in the both front and rear end parts of the bead 28 by pressing the outer surface of the base wall portion 14 by the press and, further, the material on the sides of the recesses 31 can move, whereby the part of the bead 28 between the both front and rear end parts can be formed thick. Simultaneously, the shorting terminal facing portion 32 can be formed at a position higher than the bottoms 36 of the recesses 31 in the outer surface of the base wall portion 14.

By forming the part of the bead 28 between the both front and rear end parts thicker than the both front and rear end parts of the bead 28, sufficient durability can be ensured for the shorting terminal 60 when the shorting terminal 60 contacts the shorting terminal facing portion 32. As a result, the connection reliability of the terminal fitting 10 and the shorting terminal 60 can be more improved.

Other Embodiments

The embodiment disclosed this time should be considered illustrative in all aspects, rather than restrictive.

Although the lower (inner) surface of the bead is formed linearly along the front-rear direction in the case of the above embodiment, the lower surface of the bead may be curved upward as another embodiment.

Although the shorting terminal facing portion is arranged at the position lower than the reference surface of the base wall portion in the case of the above embodiment, the shorting terminal facing portion may be arranged at the same height position as or at a position higher than the reference surface of the base wall portion as another embodiment.

Although the recesses and the shorting terminal facing portion are connected to form a curved surface in the upper surface of the bead in the case of the above embodiment, the recesses and the shorting terminal facing portion may be connected at an obtuse angle as another embodiment.

LIST OF REFERENCE NUMERALS

10 . . . terminal fitting
11 . . . connecting portion
12 . . . wire barrel portion
13 . . . insulation barrel portion
14 . . . base wall portion
15, 16 . . . side wall portion
17 . . . inner wall portion
18 . . . outer wall portion
19 . . . lance hole
21 . . . locking projection
22 . . . protrusion
23 . . . lance entering portion
24 . . . resilient contact portion
25 . . . contact point
26 . . . cut
27 . . . stabilizer
28 . . . bead
29 . . . reference surface
31 . . . recess
32 . . . shorting terminal facing portion
33 . . . first region
34 . . . second region
36 . . . bottom
60 . . . shorting terminal
61 . . . base portion
62 . . . fixing portion
63 . . . resilient piece
64 . . . contact surface
70 . . . front holder
71 . . . insertion opening
80 . . . housing
81 . . . cavity
82 . . . locking lance
83 . . . shorting terminal accommodating portion
84 . . . mounting hole
85 . . . stepped portion
86 . . . partition wall
90 . . . retainer
91 . . . retaining portion
100 . . . coated wire
110 . . . coating
120 . . . core wire
200 . . . mating terminal fitting
210 . . . tab
300 . . . receiving die
310 . . . receiving surface
311 . . . recessed surface portion
400 . . . press die
410 . . . press surface
411 . . . projection
412 . . . escaping portion

What is claimed is:

1. A terminal fitting, comprising:
a tubular connecting portion; and
a deflectable and deformable resilient contact portion arranged in the connecting portion,
wherein:
the connecting portion includes a bead extending in a front-rear direction and projecting inward toward a contact point of the resilient contact portion on a base wall portion facing the contact point, and
an outer surface of the base wall portion includes:
recesses recessed inwardly in both front and rear end parts of the bead; and
a shorting terminal facing portion located outwardly of bottoms of the recesses between the both front and rear end parts of the bead.

2. The terminal fitting of claim 1, wherein a part of the bead between the both front and rear end parts in the base wall portion is thicker than the both front and rear end parts of the bead.

3. A connector, comprising:
the terminal fitting of claim 1; and
a housing for accommodating a pair of the terminal fittings and a shorting terminal,
the shorting terminal having a pair of contact surfaces facing the shorting terminal facing portions in the pair of terminal fittings.

4. The connector of claim 3, wherein:
the recesses are arranged in a widthwise central part of the outer surface of the base wall portion, and
a widthwise central part of the contact surface is arranged at a position deviated in a width direction from the widthwise central part of the outer surface of the base wall portion.

* * * * *